United States Patent
Kresnyak (10) Patent No.: US 9,169,443 B2
(45) Date of Patent: Oct. 27, 2015

(54) PROCESS FOR HEAVY OIL AND BITUMEN UPGRADING

(75) Inventor: Steve Kresnyak, Calgary (CA)

(73) Assignee: Expander Energy Inc., Calgary, CA (US)

( * ) Notice: Subject to any disclaimer, the term of this patent is extended or adjusted under 35 U.S.C. 154(b) by 268 days.

(21) Appl. No.: 13/091,025

(22) Filed: Apr. 20, 2011

(65) Prior Publication Data

US 2012/0270957 A1 Oct. 25, 2012

(51) Int. Cl.
| | |
|---|---|
| *C07C 27/00* | (2006.01) |
| *C10G 2/00* | (2006.01) |
| *C10J 3/00* | (2006.01) |
| *C10K 3/06* | (2006.01) |
| *C01B 3/38* | (2006.01) |

(52) U.S. Cl.
CPC . *C10G 2/30* (2013.01); *C01B 3/382* (2013.01); *C01B 3/384* (2013.01); *C10J 3/00* (2013.01); *C10K 3/06* (2013.01); *C01B 2203/0233* (2013.01); *C01B 2203/0244* (2013.01); *C01B 2203/0283* (2013.01); *C01B 2203/043* (2013.01); *C01B 2203/0405* (2013.01); *C01B 2203/062* (2013.01); *C01B 2203/1047* (2013.01); *C01B 2203/1082* (2013.01); *C10G 2300/1022* (2013.01); *C10G 2300/1077* (2013.01); *C10G 2300/206* (2013.01); *C10G 2300/42* (2013.01); *C10J 2300/0913* (2013.01); *C10J 2300/0959* (2013.01); *C10J 2300/1659* (2013.01)

(58) Field of Classification Search
CPC ............. C10G 2/30; C10G 2300/1022; C10G 2300/1077; C10K 3/06; C01B 3/382; C01B 2203/0233; C01B 2203/0244; C01B 2203/0283; C01B 2203/0405; C01B 2203/043; C10J 3/00
USPC .......................................... 518/700, 702, 705
See application file for complete search history.

(56) References Cited

U.S. PATENT DOCUMENTS

| | | | |
|---|---|---|---|
| 2,574,469 A | 11/1951 | Dressler et.al. |
| 3,351,563 A | 11/1967 | Negra et al. |
| 3,941,820 A | 3/1976 | Jackson et al. |
| 4,217,112 A | 8/1980 | Johanson |
| 4,234,412 A | 11/1980 | Boersma et al. |
| 4,592,827 A | 6/1986 | Galiasso et al. |
| 5,378,348 A | 1/1995 | Davis et al. |
| 5,494,653 A | 2/1996 | Paisley |
| 6,043,288 A | 3/2000 | DeGeorge et al. |
| 6,048,449 A | 4/2000 | Bogdan et al. |
| 6,183,627 B1 | 2/2001 | Friday et al. |
| 6,241,874 B1 | 6/2001 | Wallace et al. |
| 6,306,917 B1 | 10/2001 | Bohn et al. |
| 6,395,944 B1 | 5/2002 | Griffiths et al. |
| 6,512,018 B2 | 1/2003 | Kennedy |
| 6,531,516 B2 | 3/2003 | Davis et al. |
| 6,540,023 B2 | 4/2003 | Davis et al. |
| RE38,170 E | 7/2003 | DeGeorge et al. |
| 6,596,780 B2 | 7/2003 | Jahnke et al. |
| 6,602,404 B2 | 8/2003 | Walsh et al. |
| 6,656,343 B2 | 12/2003 | Dancuart |
| 6,693,138 B2 | 2/2004 | O'Rear |
| 6,696,501 B2 | 2/2004 | Schanke et al. |
| 6,702,936 B2 | 3/2004 | Rettger et al. |
| 6,730,285 B2 | 5/2004 | Aasberg-Petersen et al. |
| 6,765,025 B2 | 7/2004 | Ding et al. |
| 6,863,802 B2 | 3/2005 | O'Rear et al. |
| 6,872,753 B2 | 3/2005 | Landis et al. |
| 6,929,087 B1 | 8/2005 | Sheppard |
| 6,958,363 B2 | 10/2005 | Espinoza et al. |
| 7,004,985 B2 | 2/2006 | Wallace et al. |
| 7,208,530 B2 | 4/2007 | Norbeck et al. |

(Continued)

FOREIGN PATENT DOCUMENTS

| | | |
|---|---|---|
| CA | 2320509 | 8/1999 |
| CA | 2595880 | 12/2005 |

(Continued)

OTHER PUBLICATIONS

Daniel B. Gillis and Fred Van Tine, What's New in Solvent Deasphalting? Foster Wheeler International Corporation, Heavy Oils Conference, Jun. 1998, pp. 16-1 to 16-13.

(Continued)

*Primary Examiner* — Jafar Parsa
(74) *Attorney, Agent, or Firm* — MBM Intellectual Property Law LLP (57) ABSTRACT

A bitumen and heavy oil upgrading process and system is disclosed for the synthesis of hydrocarbons, an example of which is synthetic crude oil (SCO). The process advantageously avoids the waste attributed to residuum and/or petcoke formation which has a dramatic effect on the yield of hydrocarbon material generated. The process integrates Fischer-Tropsch technology with gasification and hydrogen rich gas stream generation. The hydrogen rich gas generation is conveniently effected using singly or in combination a hydrogen source, a hydrogen rich vapor from hydroprocessing and the Fischer-Tropsch process, a steam methane reformer (SMR) and autothermal reformer (ATR) or a combination of SMR/ATR. The feedstock for upgrading is distilled and the bottoms fraction is gasified and converted in a Fischer-Tropsch reactor. A resultant hydrogen lean syngas is then exposed to the hydrogen rich gas stream to optimize the formation of, for example, the synthetic crude oil. The hydrogen lean gas stream may also be effected by a water gas shift reaction, singly or in combination or in addition with the hydrogen rich gas stream generation. A system for effecting the process is also characterized in the specification.

35 Claims, 5 Drawing Sheets

(56) References Cited

U.S. PATENT DOCUMENTS

| | | |
|---|---|---|
| 7,214,720 B2 | 5/2007 | Bayle et al. |
| 7,381,320 B2 | 6/2008 | Iqbal et al. |
| 7,407,571 B2 | 8/2008 | Rettger et al. |
| 7,413,647 B2 | 8/2008 | Calderon et al. |
| 7,566,394 B2 | 7/2009 | Koseoglu |
| 7,677,309 B2 | 3/2010 | Shaw et al. |
| 7,708,877 B2 | 5/2010 | Farshid et al. |
| 7,749,378 B2 | 7/2010 | Iqbal et al. |
| 7,776,114 B2 | 8/2010 | Rüger et al. |
| 7,795,317 B2 | 9/2010 | Eilers et al. |
| 7,795,318 B2 | 9/2010 | Van Hardeveld |
| 7,846,979 B2 | 12/2010 | Rojey et al. |
| 7,855,235 B2 | 12/2010 | Van Hardeveld |
| 7,863,341 B2 | 1/2011 | Routier |
| 7,879,919 B2 | 2/2011 | Ernst et al. |
| 2001/0051662 A1 | 12/2001 | Arcuri et al. |
| 2003/0221992 A1 | 12/2003 | Gorbaty et al. |
| 2004/0181313 A1 | 9/2004 | Mohedas et al. |
| 2005/0173305 A1 | 8/2005 | Smith |
| 2005/0250862 A1 | 11/2005 | Bayle et al. |
| 2006/0167118 A1 | 7/2006 | Tijm et al. |
| 2006/0231455 A1 | 10/2006 | Olsvik et al. |
| 2008/0021119 A1 | 1/2008 | Norbeck et al. |
| 2008/0021122 A1 | 1/2008 | Norbeck et al. |
| 2008/0115415 A1 | 5/2008 | Agrawal et al. |
| 2008/0116111 A1 | 5/2008 | Newton |
| 2009/0084707 A1 | 4/2009 | Gil |
| 2009/0200209 A1 | 8/2009 | Sury et al. |
| 2009/0292571 A1 | 11/2009 | Gil et al. |
| 2010/0000153 A1 | 1/2010 | Kurkjian et al. |
| 2010/0036181 A1 | 2/2010 | Diebold et al. |
| 2010/0113624 A1 | 5/2010 | Routier et al. |
| 2010/0137458 A1 | 6/2010 | Erling et al. |
| 2010/0144905 A1 | 6/2010 | Reaveley et al. |
| 2010/0216898 A1 | 8/2010 | Tonseth et al. |
| 2011/0009501 A1 | 1/2011 | Ernst |
| 2011/0049016 A1 | 3/2011 | McGrady et al. |
| 2014/0350131 A1 | 11/2014 | Kresnyak |
| 2015/0038599 A1 | 2/2015 | Kresnyak |

FOREIGN PATENT DOCUMENTS

| | | |
|---|---|---|
| CA | 2657656 | 1/2008 |
| CA | 2731376 | 6/2010 |
| CA | 2737872 | 5/2012 |
| CA | 2809503 | 6/2013 |
| CA | 2818322 | 4/2014 |
| CN | 101864324 | 10/2010 |
| EP | 1608924 | 9/2007 |
| RU | 2364616 | 8/2009 |
| WO | 2007009951 | 1/2007 |

OTHER PUBLICATIONS

Wassim Bedrouni, Bitumen Extraction and Upgrading Coke Gasification with CO2 Capture, 2008, Odec.

Tom Kemp, Prospects for the Future Oil Sands Production (presentation), Jacobs Engineering Canada, Syngas Refiner Oil Sands Workshop, Calgary, Alberta, Canada, Jul. 27, 2006.

Gary, J.H. et al., Petroleum Refining Technology and Economics, 5th ed, CRC Press, 2007, 465 pgs [Office Action cites figure 1.1].

Zinnurovich et al., English abstract corresponding to RU2364616, Aug. 20, 2009.

T.F. Yen, Correlation Between Heavy Crude Sources and Types and Their Refining and Upgrading Methods, No. 1998231, Proceeding of the 7th UNITAR International Conference on Heavy Crude and Tar Sands, Beijing, vol. 2, pp. 2137-2144 (1998).

PROCESS FOR HEAVY OIL AND BITUMEN UPGRADING

TECHNICAL FIELD

The present invention relates to modifications of bitumen and heavy oil upgrading processes to synthesize synthetic crude oil and other valuable hydrocarbon byproducts operations in an efficient manner.

BACKGROUND OF THE INVENTION

It is well established that certain forms of hydrocarbons require upgrading in order to either transport them or enhance value for sale. Further, refineries are not suited to processing heavy oil, bitumen etc. and thus the viscosity, density and impurity content, such as heavy metals, sulfur and nitrogen, present in such heavy materials must be altered to permit refining. Upgrading is primarily focussed upon reducing viscosity, sulphur, metals, and asphaltene content in the bitumen.

One of the problems with heavy oil and bitumen upgrading is that the asphaltenes and the heavy fraction must be removed or modified to create value and product yield. Typical upgraders exacerbate the problem by the formation of petcoke or residuum which results in undesirable waste material. This material, since it cannot be easily converted by conventional methods, is commonly removed from the process, reducing the overall yield of valuable hydrocarbon material from the upgrading process.

The Fischer-Tropsch process has found significant utility in hydrocarbon synthesis procedures and fuel synthesis. The process has been used for decades to assist in the formulation of hydrocarbons from several materials such as coal, residuum, petcoke, and biomass. In the last several years, the conversion of alternate energy resources has become of great interest, given the escalating environmental concerns regarding pollution, the decline of world conventional hydrocarbon resources, and the increasing concern over tailings pond management, together with the increasing costs to extract, upgrade and refine the heavy hydrocarbon resources. The major producers in the area of synthetic fuels have expanded the art significantly in this technological area with a number of patented advances and pending applications in the form of publications. Applicant's co-pending U.S. application Ser. No. 13/024,925, teaches a fuel synthesis protocol and the entire contents of that application are incorporated herein for reference.

Examples of recent advances that have been made in this area of technology includes the features taught in U.S. Pat. No. 6,958,363, issued to Espinoza, et al., Oct. 25, 2005, Bayle et al., in U.S. Pat. No. 7,214,720, issued May 8, 2007, U.S. Pat. No. 6,696,501, issued Feb. 24, 2004, to Schanke et al.

In respect of other progress that has been made in this field of technology, the art is replete with significant advances in, not only gasification of solid carbon feeds, but also methodology for the preparation of syngas, management of hydrogen and carbon monoxide in a GTL plant, the Fischer-Tropsch reactors management of hydrogen, and the conversion of biomass feedstock into hydrocarbon liquid transportation fuels, inter alia. The following is a representative list of other such references. This includes: U.S. Pat. Nos. 7,776,114; 6,765,025; 6,512,018; 6,147,126; 6,133,328; 7,855,235; 7,846,979; 6,147,126; 7,004,985; 6,048,449; 7,208,530; 6,730,285; 6,872,753, as well as United States Patent Application Publication Nos. US2010/0113624; US2004/0181313; US2010/0036181; US2010/0216898; US2008/0021122; US 2008/0115415; and US 2010/0000153.

The Fischer-Tropsch (FT) process has several significant benefits when applied to a bitumen upgrader process, one benefit being that it is able to convert previously generated petcoke and residuum to valuable, high quality synthetic crude oil (SCO) with notably increased paraffinic content. A further significant benefit is that the raw bitumen yield to SCO is near or greater than 100%, a 20% yield increase relative to certain current upgrader processes. Another benefit is that there is no petcoke and residuum waste product to impact the environment thus improving overall bitumen resource utilization.

A further benefit of the application of the FT process to a bitumen upgrader is that a sweet, highly paraffinic and high cetane content synthetic crude oil (SCO) is produced. More specifically, beneficial byproducts of the FT process such as paraffinic naphtha and FT vapours (such as methane and liquid petroleum gases (LPG)), have particular value within the bitumen upgrader process and upstream unit operations. FT vapours, virtually free from sulphur compounds can be used as upgrader fuel or as feedstock for hydrogen generation to offset the requirement for natural gas. FT naphtha, primarily paraffinic in nature, can also be used in the generation of hydrogen, but further, due to its unique paraffinic nature, it can also be used as an efficient deasphalting solvent not readily available from current upgrader operations.

It has also been well documented that the use of FT paraffinic naphtha as a solvent for an oilsands froth unit improves the operation and efficacy of fine tailings and water removal at a reduced diluent-to-bitumen (D/B) ratio and relatively low vapour pressure. This has significant advantages in terms of lowering the size and cost of expensive separators and settlers and increasing their separation performance and capacity rating. This results in virtually dry bitumen froth feed (<0.5 basic sediment and water) to the upgrader, while improving impact on the tailings pond.

Having thus generally discussed the appropriateness of the Fischer-Tropsch technique in synthesizing syngas to FT liquids, a discussion of the prior art and particularly the art related to the upgrading and gasifying of heavy hydrocarbon feeds would be useful.

One of the examples in this area of the prior art is the teachings of U.S. Pat. No. 7,407,571 issued Aug. 5, 2008, to Rettger et. al. This reference names Ormat Industries Ltd. as the Assignee and teaches a process for producing sweet synthetic crude oil from a heavy hydrocarbon feed. In the method, the patentees indicate that heavy hydrocarbon is upgraded to produce a distillate feed which includes sour products and high carbon byproducts. The high carbon content byproducts are gasified in a gasifier to produce a syngas and sour byproducts. The process further hydroprocesses the sour products along with hydrogen gas to produce gas and a sweet crude. Hydrogen is recovered in a recovery unit from the synthetic fuel gas. The process also indicates that further hydrogen gas is processed and hydrogen depleted synthetic fuel gas is also produced. Further hydrogen gas is supplied to the hydroprocessing unit and a gasifying step is conducted in the presence of air or oxygen. The gas mixture is scrubbed to produce a sour water and a clean sour gas mixture. The sour gas mixture is subsequently processed to produce a sweet synthetic fuel gas and a hydrogen enriched gas mixture from the synthetic fuel gas using a membrane. The overall process is quite effective, however, it does not take advantage of the conversion of synthesized streams which are useful for introduction into the hydroprocessing unit for production of synthetic crude, the recycling of unique streams for use in the upgrader, nor is there any teaching specifically of the integration of the Fischer-Tropsch process or the recognition of the benefit to the process of using a SMR and/or ATR in the process circuit to maximize SCO yields and reducing dependence on natural gas.

Iqbal et. al. in U.S. Pat. No. 7,381,320 issued Jun. 3, 2008, teaches a process for heavy oil and bitumen upgrading. In overview, the process is capable of upgrading crude oil from a subterranean reservoir. The process involves converting asphaltenes to steam power, fuel gas, or a combination of these for use in producing heavy oil or bitumen from a reservoir. A portion of the heavy oil or bitumen are solvent deasphalted to form an asphaltene fraction and a deasphalted oil, referred to in the art as DAO as a fraction free of asphaltenes and with reduced metals content. The asphaltene fraction from the solvent deasphalting is supplied to the asphaltenes conversion unit and a feed comprising the DAO fraction supplied to a reaction zone of a fluid catalytic cracking (FCC) unit with an FCC catalyst to capture a portion of the metals from the DAO fraction. A hydrocarbon effluent is recovered from this having a reduced metal content. Similar to the process taught in U.S. Pat. No. 7,407,571, this process has utility, however, it limits the conversion of the otherwise wasteful asphaltene to production of solid fuel or pellets or conversion to syngas for fuel, hydrogen or electric power production. There is no teaching specifically integrating the Fischer-Tropsch process.

In U.S. Pat. No. 7,708,877 issued May 4, 2010 to Farshid et. al. there is taught an integrated heavy oil upgrader process and in line hydro finishing process. In the process, a hydro-conversion slurry reactor system is taught that permits a catalyst, unconverted oil and converted oil to circulate in a continuous mixture throughout a reactor with no confinement of the mixture. The mixture is partially separated between the reactors to remove only the converted oil while allowing unconverted oil in the slurry catalyst to continue on to the next sequential reactor where a portion of the unconverted oil is converted to a lower boiling point. Additional hydro processing occurs in additional reactors for full conversion of the oil. The so called fully converted oil is subsequently hydrofinished for nearly complete removal of heteroatoms such as sulfur and nitrogen.

This document is primarily concerned with hydroconversion of heavy hydrocarbon, while not being suitable for bitumen upgrading. It also fails to provide any teaching regarding the use of Fischer-Tropsch process, usefulness of recycle streams, hydrogen generation or other valuable and efficient unit operations critical to successful upgrading of raw bitumen.

Calderon et. al. in U.S. Pat. No. 7,413,647 issued Aug. 19, 2008, teach a method and apparatus for upgrading bituminous material. The method involves a series of four distinct components, namely a fractionator, a heavy gas oil catalytic treater, a catalyst regenerator/gasifier and a gas clean up assembly. The patent indicates that in practicing the method, the bitumen in liquid form is fed to the fractionator for primary separation of fractions with the bulk of the bitumen leaving the bottom of the fractionator in the form of a heavy gas oil which is subsequently pumped to the catalytic treater and sprayed on a hot catalyst to crack the heavy gas oil, thus releasing hydrocarbons in the form of hydrogen rich volatile matter while depositing carbon on the catalyst. The volatile matter from the treater is passed to the fractionator where condensable fractions are separated from noncondensable hydrogen rich gas. The carbon containing catalyst from the treater is recycled to the regenerator/gasifier and the catalyst, after being regenerated is fed hot to the treater.

The method does not incorporate the particularly valuable Fischer-Tropsch process or provide a unit for effecting the Fischer-Tropsch reaction and further, the method is limited by the use of the catalyst which would appear to be quite susceptible to sulfur damage and from this sense there is no real provision for handling the sulfur in the bitumen.

In United States Patent Application, Publication No. US 2009/0200209, published Aug. 13, 2009, Sury et. al. teach upgrading bitumen in a paraffinic froth treatment process. The method involves adding a solvent to a bitumen froth emulsion to induce a settling rate of at least a portion of the asphaltenes and mineral solids present in the emulsion and results in the generation of the solvent bitumen-froth mixture. Water droplets are added to the solvent bitumen-froth mixture to increase the rate of settling of the asphaltenes and mineral solids. The focus of the publication is primarily to deal with the froth. There is no significant advance in the upgrading of the bitumen.

A wealth of advantages are derivable from the technology that has been developed and which is described herein. These are realized in a number of ways including:

i) near 100% or greater synthetic crude yield from heavy oil or bitumen without the wasteful production of petcoke or residuum;

ii) the synthetic crude oil (SCO) slate is higher quality, sweet light crude with more paraffinic and less aromatic and heavy gas oil components in the product slate;

iii) less natural gas is required to generate hydrogen for upgrading as the FT naphtha, FT vapours and hydroprocessing vapours can be recycled to generate a hydrogen rich syngas;

iv) pure hydrogen can be generated from the hydrogen rich syngas using membranes, absorption or pressure swing adsorption units, for use in the hydroprocessing (hydrocracking, isomerisation, hydrotreating) units;

v) Fischer-Tropsch (FT) liquids are primarily pariffinic in nature improving the quality and value of SCO product slate;

vi) FT naphtha is rarely available in any quantity in current upgraders and would be very preferentially used for deasphalting vacuum bottoms in a Solvent Deasphalting Unit (SDA) and in a Oilsands Froth Treatment Unit; and vii) Concentrated $CO_2$ is available from the gasifier (XTL) syngas treatment unit, allowing the upgrader to be a low cost carbon capture ready $CO_2$ source for carbon capture and sequestration (CCS) projects.

SUMMARY OF THE INVENTION

One object of the present invention is to provide an improved heavy oil and bitumen upgrading methodology for synthesizing hydrocarbons with a substantially increased yield without the production of waste byproducts such as petcoke or residuum.

A further object of one embodiment of the present invention is to provide a process for upgrading bitumen to formulate hydrocarbon byproducts, comprising:

i) providing a source of bitumen or heavy oil feedstock;

ii) treating said feedstock to form a non-distilled bottoms fraction;

iii) feeding said bottoms fraction to a syngas generating circuit for formulating a hydrogen lean syngas stream via a non-catalytic partial oxidation reaction, and reacting said syngas in a Fischer-Tropsch reactor to synthesize hydrocarbon byproducts;

iv) adding a source of hydrogen to said hydrogen lean syngas to optimize the synthesis of hydrocarbons at least one of which is synthetic crude oil.

The present technology mitigates the oversights exemplified in the prior art references. Despite the fact that the prior art, in the form of patent publications, issued patents, and other academic publications, all recognize the usefulness of a Fischer-Tropsch process, steam methane reforming, autothermal reforming, hydrocarbon upgrading, synthetic oil formulation, stream recycle, and other processes, the prior art when taken individually or when mosaiced is deficient a process that provides the efficient upgrading of bitumen and heavy oil in the absence of residuum and/or petcoke generation.

Synthetic crude is the output from a bitumen/heavy oil upgrader facility used in connection with bitumen and heavy oil from mineable oilsands and in situ production. It may also refer to shale oil, an output from an oil shale pyrolysis. The properties of the synthetic crude depend on the processes used in the upgrading. Typically, it is low in sulfur and has an API gravity of around 30, suitable for conventional refinery feedstock. It is also known as "upgraded crude".

The present invention amalgamates, in a previously unrecognized combination, a series of known unit operations into a much improved synthesis route for a high yield, high quality production of synthetic hydrocarbons. Integration of a Fischer-Tropsch process, and more specifically the integration of a Fischer-Tropsch process with a hydrogen rich syngas generator which uses FT naphtha and/or FT/upgrader vapours as primary fuel in combination with natural gas, in a steam methane reformer (SMR) and/or an autothermal reformer (ATR) results in a superior sweet synthetic crude oil which is synthesizable in the absence of petcoke and residuum.

It was discovered that, by employing a steam methane reformer (SMR) as a hydrogen rich syngas generator using FT naphtha and FT/upgrader vapours, in combination with natural gas, significant results can be achieved when blended with the hydrogen lean syngas created by the gasification of non-distilled bitumen or heavy oil bottoms. A significant production increase in middle distillate synthetic hydrocarbons range is realized. The general reaction is as follows;

As is well known to those skilled in the art, steam methane reforming may be operated at any suitable conditions to promote the conversion of the feedstreams, an example as shown in above equation, to hydrogen $H_2$ and carbon monoxide CO, or what is referred to as syngas or specifically as hydrogen rich syngas. Significant benefits resulted in a great than 30% increase in middle distillate synthesized hydrocarbon. Steam and natural gas is added to optimize the desired ratio of hydrogen to carbon monoxide to approximate range of 3:1 to 6:1. A water gas shift reaction (WGS), pressure swing adsorption (PSA) or membrane unit can also be added to any portion of the SMR syngas circuit to further enrich the hydrogen rich stream and generate a near pure hydrogen stream for hydroprocessing use. Generally natural gas or any other suitable fuel is used to provide the heat energy for the SMR furnace.

The steam reformer may contain any suitable catalyst, an example of one or more catalytically active components such as palladium, platinum, rhodium, iridium, osmium, ruthenium, nickel, chromium, cobalt, cerium, lanthanum, or mixtures thereof. The catalytically active component may be supported on a ceramic pellet or a refractory metal oxide. Other forms will be readily apparent to those skilled.

It was further discovered that employing an autothermal reformer (ATR) as a sole hydrogen rich syngas generator or in combination with the SMR or as a hybrid combination of an ATR/SMR referred to as a XTR, significant benefits resulted in a greater than 200% increase in the FT middle distillate synthetic hydrocarbons. Feedstreams for the ATR or XTR consist of FT naphtha, FT vapours, $H_2$ rich upgrader vapours, $CO_2$, $O_2$ and natural gas.

Similarly, as is well known to those skilled in the art, autothermal reforming employs carbon dioxide and oxygen, or steam, in a reaction with light hydrocarbon gases like natural gas, FT vapours and upgrader vapours to form syngas. This is an exothermic reaction in view of the oxidation procedure. When the autothermal reformer employs carbon dioxide, the hydrogen to carbon monoxide ratio produced is 1:1 and when the autothermal reformer uses steam, the ratio produced is approximately 2.5:1, or unusually as high as 3.5:1.

The reactions that are incorporated in the autothermal reformer are as follows:

When steam is employed, the reaction equation is as follows:

One of the more significant benefits of using the ATR is realized in the variability of the hydrogen to carbon monoxide ratio. In the instant technology, an ATR may also be considered as a hydrogen rich syngas generator, as described previously. It has been found that the addition of the ATR operation to the circuit in combination with the hydrogen rich syngas generation circuit, shown in the example above as a steam methane reformer (SMR), has a significant effect on the hydrocarbon productivity from the overall process. Similarly, a water gas shift reaction (WGS), pressure swing adsorption (PSA) or membrane unit can also be added to any portion of the ATR and combined ATR/SMR or XTR syngas circuit to further enrich the hydrogen rich stream and generate a near pure hydrogen stream for hydroprocessing use. Generally natural gas or any other suitable fuel is used to provide the heat energy for the ATR, SMR and XTR furnaces.

The present invention further amalgamates, in a previously unrecognized combination, a series of known unit operations to integrate the Fischer-Tropsch process, using a water gas shift reaction for syngas enrichment resulting in a valuable sweet synthetic crude oil which is synthesizable in the absence of petcoke and residuum.

Accordingly, a further object of one embodiment of the present invention is to provide a process for upgrading heavy oil and bitumen to formulate hydrocarbon byproducts, comprising:
  i) providing a source of bitumen or heavy oil feedstock treating said feed to distillation to form a non-distilled bottoms fraction;
  ii) feeding the bottoms fraction to a syngas generating circuit for formulating a hydrogen lean syngas stream via a non-catalytic partial oxidation reaction;
  iii) treating the said hydrogen lean syngas stream to a water gas shift (WGS) reaction to generate an optimum Fischer-Tropsch syngas; and
  iv) treating said optimum Fischer-Tropsch syngas stream in a Fischer-Tropsch unit to synthesize hydrocarbons byproducts, where at least one of which is synthetic crude.

In accordance with a further object of one embodiment of the present invention, there is provided a system for upgrading bitumen to formulate hydrocarbon byproducts, comprising:
  i) a first bitumen processing stage for processing said bitumen into liquid and residuum materials by distillation;

ii) a second stage for gasifying said residuum materials and formulating Fischer-Tropsch products;

iii) a third stage for hydroprocessing said Fischer-Tropsch products to generate synthetic crude and an excess hydrogen stream, and;

iv) a fourth stage for hydrocarbon synthesis to combine with excess hydrogen stream from said third stage, said combination for optimizing a hydrogen to carbon ratio as a feed to a Fischer-Tropsch reactor whereby synthetic crude oil can be synthesized.

In terms of further variations on the above process, the Fischer-Tropsch reaction may be further treated with a water gas shift reaction (WGS). Accordingly, it is another object of one embodiment of the present invention to provide the process, wherein the water gas shift reactor (WGS) is replaced by a hydrogen rich syngas generator (XTR) selected from the group consisting of a steam methane reformer (SMR), autothermal reformer (ATR) or combination thereof.

Referring now to the drawings as they generally describe the invention, reference will now be made to the accompanying drawings illustrating preferred embodiments.

BRIEF DESCRIPTION OF THE DRAWINGS

Similar numerals employed in the figures denote similar elements.

DETAILED DESCRIPTION OF PREFERRED EMBODIMENTS

Figure 1:
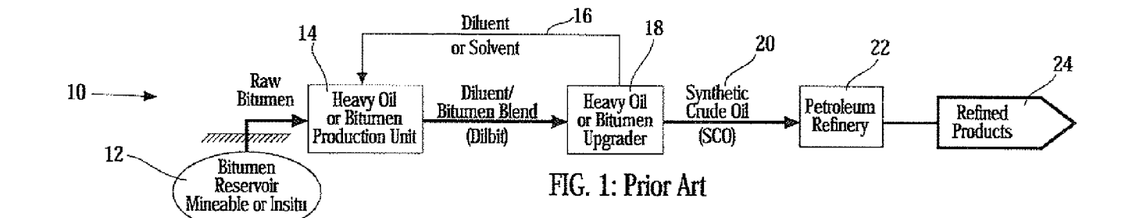
FIG. 1 is a process flow diagram of methodology known in the prior art for processing of mineable and in situ heavy oil and bitumen.

Referring now to FIG. 1, shown is a first embodiment of a bitumen production flow diagram based on the prior art. The overall process is denoted by 10. In the process, the heavy oil or bitumen source 12 may comprise a bitumen reservoir which may be minable or in situ. Generally speaking, the bitumen then may be transported to a heavy oil or bitumen production unit 14 into which diluent or solvent may be introduced via line 16 from a heavy oil or bitumen upgrader 18. The diluent or solvent can comprise any suitable material well known to those skilled in the art such as suitable liquid alkanes as an example. Once the diluent is introduced via line 16 into the production unit 14, the result is a mobilizable bitumen blend (dilbit). Once the diluted bitumen blend is processed in the upgrader 18, the so formed synthetic crude, globally denoted by 20 is then treated in a petroleum refinery 22 where subsequently refined products are formulated and with the refined products being globally denoted by 24.

The production unit 14 primarily removes water and solids from the stream. The diluent or solvent 16 is added to the raw bitumen to provide for the necessary mobilization and separation parameters, primarily providing a reduction in viscosity. In a situation where the bitumen is an oilsand derived bitumen, water is added to the raw material to provide a slurry for transport to the extraction and froth treatment plant and upgrader 18, as further described in FIG. 2. Dewatered bitumen is then transported by pipeline (not shown) as a diluent blend or dilbit to the upgrader 18. The dry raw bitumen is treated to primary and secondary treatment to create a sweet or sour crude oil (SCO). The SCO is transported to the petroleum refinery 22 to be further processed into refined product 24 as indicated above, examples of which include transport fuel such as gasoline, diesel and aviation fuels, lube oils and other feedstocks for petrochemical conversion.

Figure 2:
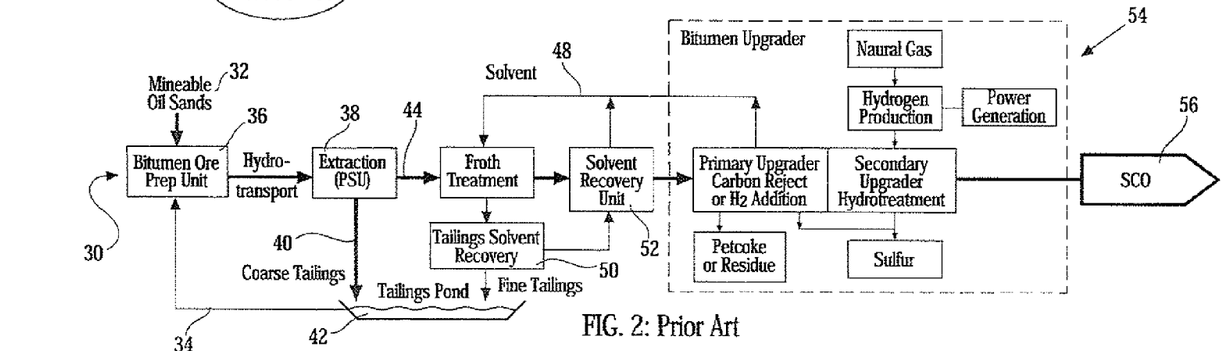
FIG. 2 is a process flow diagram similar to FIG. 1, illustrating a further technique known in the art.

With respect to FIG. 2, shown is a schematic process flow diagram of oilsands operation for bitumen upgrading. The overall process in this flow diagram is indicated by 30. Other than the embodiment shown, the system relates to a minable oilsands bitumen production process where raw mined oilsands ore, generally denoted by 32, from the mine are mixed with water 34 in an ore preparation unit 36 and subsequently hydrotransported to a primary extraction plant, denoted by 38. In the extraction plant 38, the greater portion of water 34 and course tailings 40 are separated and returned to a tailings pond 42.

Partially dewatered bitumen, generally denoted by 44 is transferred to a froth treatment unit 46. This is where a solvent, typically highly aromatic naphtha (derived from bitumen) or paraffinic solvent (derived from natural gas liquids) is added at 48 to separate the remaining water and refined clays as well as fine tailings. The froth is then treated in a solvent recovery unit 40 where the majority of the solvent is recovered for recycle to the froth treatment unit. The separated fine tailings passes through a tailings solvent recovery unit 50 for final recovery of solvent. The fine tailings are transferred into the tailings pond 42. The clean dry froth is then introduced into the bitumen upgrader, generally denoted by 54 and illustrated in FIG. 2 in dashed line. Generally speaking the bitumen upgrader 54 incorporates two general processes, a primary and secondary upgrading. The primary upgrader typically consists of two processing methodologies. The first, namely, carbon rejection or coking where the heavy fraction of the bitumen is removed as petcoke. Generally, the synthetic crude oil yield is between about 80 to about 85% by volume and the remaining portion converted primarily by petcoke is returned for storage to the mine. Further the coking process is a severe processing method and leads to higher aromatic content in the synthetic crude oil. The second process, namely hydrogen addition, uses a slurry based catalytic hydroprocessing system with the addition of hydrogen to treat the bitumen blend and produce an asphaltene reject and synthetic crude oil product. The yield of the synthetic crude oil typically exceeds 100% due to product swelling.

The hydrocarbon product streams from primary upgrading are further treated in secondary upgrader, consisting of hydrotreating units using hydrogen to stabilize synthetic crude products generally indicated as 56 and reduce sulfur and nitrogen impurities. Natural gas is used in a hydrogen unit to generate hydrogen requirements for the upgrader and co-generate electric power for upgrader use. The overall operations in the bitumen upgrader are indicated within the dash lines and these operations are well known to those skilled in the art.

Figure 3:
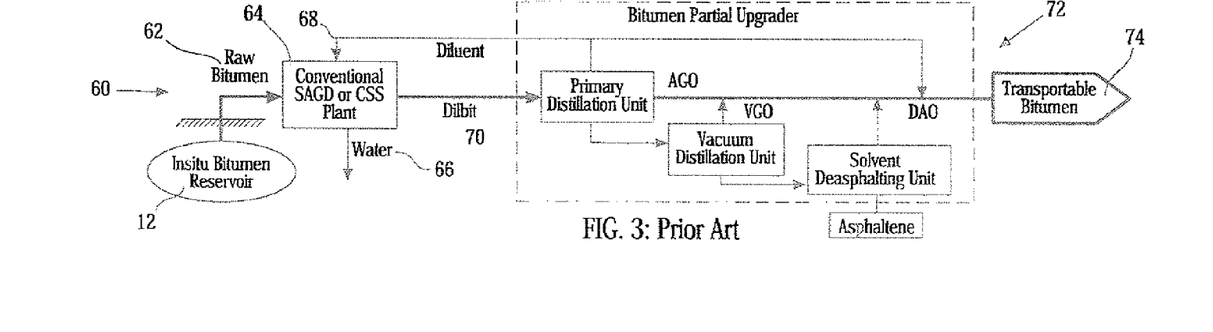
FIG. 3 is a process flow diagram illustrating a further variation of the prior art technology.

Turning to FIG. 3, shown is a further partial upgrading process known in the prior art, in this arrangement, the process flow diagram delineates an in situ bitumen production unit. The overall process is denoted by 60. In such an arrangement, the in situ heavy oil or bitumen is exposed to steam to extract the oil. The raw bitumen 62 is treated in a conventional SAGD or CSS plant 64 to remove water 66. Diluent 68 is typically added to raw bitumen 62 in plant 64 to create water oil separation and to further provide a diluted blend for pipeline transportation, more commonly referred to in the art as "dilbit" denoted by 70. The dilbit can be transported over long distances in a pipeline (not shown) to remote refineries where it is blended with conventional crude as a feedstock. More integrated configurations may use distillation, deasphalting or visbreaking, a processing to create a near bottomless sour heavy crude for feed to refineries. This operation creates an asphaltene or vacuum residue stream requiring disposal. This partially upgraded bitumen is suitable for pipeline transportation. Often some quantity of diluent is still required to meet crude pipeline specifications. The dilbit is processed in a bitumen partial upgrader denoted by 72 with the operations being shown within the dashed line box. The transportable bitumen is denoted by 74 in FIG. 3.

As will be appreciated by those skilled, the process variations shown in FIGS. 1 through 3 of existing bitumen and heavy oil production facilities either create a waste product such as petcoke or residuum which leads to significant losses or further requires significant quantities of hydrogen or diluent to upgrade the product in order to be suitable as a refinery feedstock. Essentially, the existing processes do not provide a technology capable of capturing the full intrinsic value of the bitumen or heavy oil and has resulted in environmental impact related to disposal and management of undesirable waste products.

Figure 4:
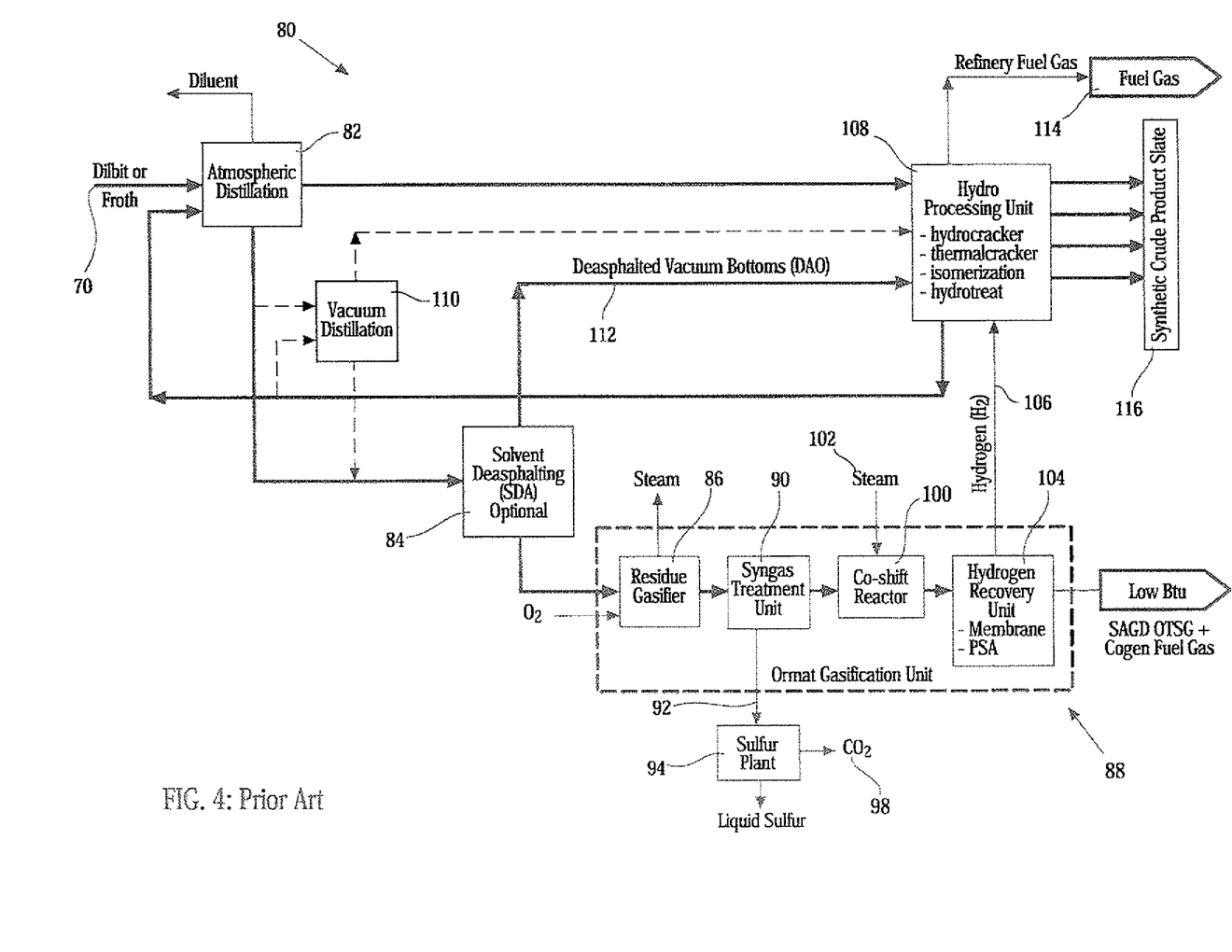
FIG. 4 is a process flow diagram illustrating a further variation of the prior art technology.

Turning to FIG. 4, shown is a further variation in the prior art of an enhanced bitumen upgrading process. It is the subject matter of Canadian Patent No. 2,439,038 and its United States homolog, U.S. Pat. No. 7,407,571 issued to Rettger, et. al. (Ormat Industries Ltd.).

The overall process is denoted by 80.

Dilbit or froth 70 is introduced into an atmosphere of distillation unit 82 with the non-distilled heavy bottoms being transported and introduced into a solvent deasphalting unit (SDA) 84 and the asphaltene bottoms are then subsequently fed into a gasifier 86, which gasifier is within the Ormat gasification unit, globally denoted by 88. The deasphalted material, commonly denoted as DAO is transferred to the hydroprocessing unit 108 for upgrading to synthetic crude oil. As an option, there may be a vacuum distillation unit 110 in the circuit which may introduce captured vacuum gasoils for introduction into hydroprocessing unit 108. Similarly, the vacuum bottoms are introduced into the SDA 84 to optimize process configuration.

The sour syngas generated by the gasification unit is then passed into a syngas treater 90 for acid gas removal. The acid gas is removed at 92 and treated in sulfur plant 94 producing at least products such as liquid sulfur 96 and $CO_2$ 98. The treated or "sweet" syngas is then processed in a water gas shift reaction (WGS) process as denoted in the FIG. 4 and referred to as a CO shift reactor 100. Steam is augmented in the reactor 100. The water gas shift reaction is merely a shift from the CO to $CO_2$ to create a hydrogen rich syngas. The hydrogen rich syngas may be then further treated in a typical pressure swing unit (PSA) or a membrane unit where the hydrogen is concentrated to greater than 99 percent. It occurs in unit 104. The hydrogen generated by 104, denoted by 106 is then the feedstock for the hydroprocessing unit 108. Once the hydroprocessing occurs, the result is synthetic crude oil (SCO) denoted by 116 and fuel gas denoted by 114.

Returning briefly to the hydrogen recovery unit 104, the byproduct of the unit 104 is a tailgas or a low BTU syngas which is used in the SAGD thermal steam generators as fuel to offset the need for natural gas as the primary fuel. The process has merit in that if natural gas is in short supply or there can be significant historic price fluctuation, the enhanced upgrader process is less dependent on the natural gas and can rely on the synthesized fuel for the overall process benefits.

Figure 5:
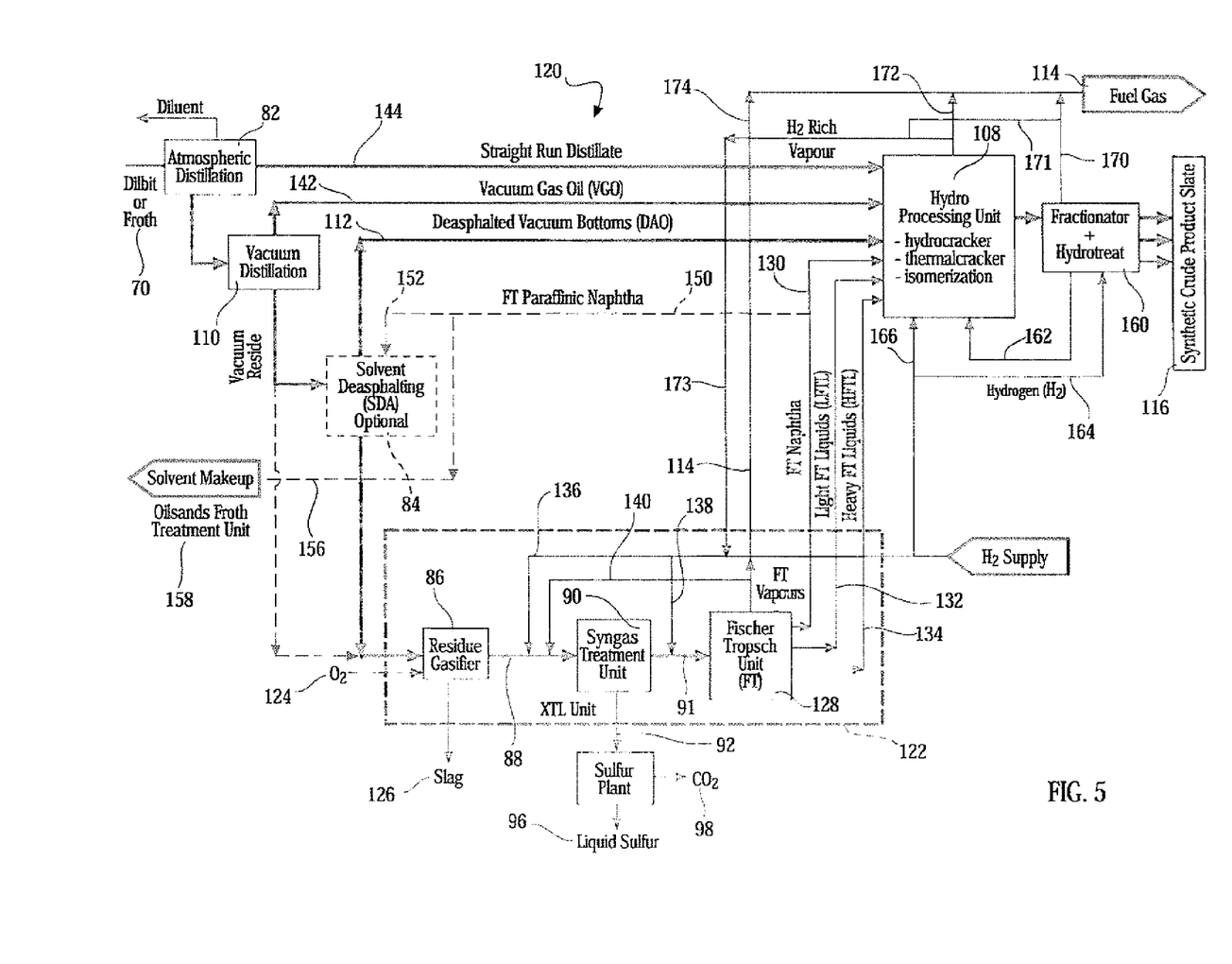
FIG. 5 is a process flow diagram illustrating an embodiment of the present invention.

Turning to FIG. 5, shown as a first embodiment of an enhanced bitumen upgrading circuit process incorporating Fischer-Tropsch technology and hydrogen synthesis. The embodiment of the overall process is denoted by 120. The overall process is particularly beneficial relative to the processes that were previously proposed in the prior art in that sweet carbon rich syngas is not passed through a water gas shift reaction, as denoted as 100 in FIG. 4, but rather is supplemented with external hydrogen 138 to create the optimum syngas composition, typically a ratio of hydrogen to carbon monoxide of greater than 1.8:1 to 2.2:1, and preferred as 2:1 as feed to Fischer-Tropsch reactor for producing high quality paraffinic Fischer-Tropsch liquids.

It is by the recognition of the usefulness of the Fischer-Tropsch reactor together with the avoidance of waste petcoke/residuum generation and the subsequent hydrogen source addition to maximize conversion of gasified carbon, that draws the proposed interim technology into the realm of being economical, convenient and highly efficient given the yields that are generated for the synthetic crude oil (SCO).

As is evident, there are a number of unit operations which are common with those in the prior art, namely the atmospheric distillation, vacuum distillation, solvent deasphalting, hydroprocessing, gasification, and syngas treatment.

In the embodiment shown, the Ormat gasification, commonly denoted as unit 88 and discussed with respect to FIG. 4 is replaced with a further sequence of operations (the XTL operations) shown in dashed lines and indicated by 122. In this embodiment, the gasifier 86 converts the non-distilled bottoms residue with typically oxygen ($O_2$) 124 to generate a hydrogen lean or carbon rich syngas 88 having a hydrogen to carbon dioxide ratio in range of 0.5:1 to 1.5:1, more specifically about 1:1, an example of which is shown in Table 1.

TABLE 1

Typical XTL Gasifier Hydrogen Lean Syngas Compositions

| | Feedstock Type | | |
| --- | --- | --- | --- |
| Syngas Composition (mole %) | Heavy Fuel Oil | Vacuum Residue | Asphaltene |
| Carbon Dioxide ($CO_2$) | 2.75% | 2.30% | 5.0% |
| Carbon Monoxide (CO) | 49.52% | 52.27% | 50.4% |
| Hydrogen ($H_2$) | 46.40% | 43.80% | 42.9% |
| Methane (CH4) | 0.30% | 0.30% | 0.3% |
| Nitrogen (+Argon)($N_2$) | 0.23% | 0.25% | 0.4% |
| Hydrogen Sulfide ($H_2S$) | 0.78% | 1.08% | 1.0% |

A common byproduct, containing heavy metals and ash, from the gasification is discharged as slag denoted as 126. The hydrogen lean syngas 88 is then passed into the syngas treatment unit 90 for removal of acid gases 92 to create a sweet hydrogen lean syngas 91. Additional scrubbing, adsorption and washing technologies (not shown), well known to those skilled in the art, are typically employed to ensure that the sweet syngas is void of contaminants such as sulfur compounds which will have significant detrimental impact on the Fischer-Tropsch catalyst. The acid gas is further treated in the sulfur plant 92 to generate elemental sulfur 96 and carbon dioxide ($CO_2$), as was the case with respect to the process of FIG. 4. The sweet hydrogen lean syngas 91 is then passed into a Fischer-Tropsch unit reactor denoted by 128. As a possibility, the hydrocarbon byproducts that are formed subsequently to reaction within the Fischer-Tropsch reactor 128 includes Fischer-Tropsch vapours 184 ($CO+H_2$+C1+C2+C3+C4), naphtha 130, light Fischer-Tropsch liquids 132 (LFTL) and heavy Fischer-Tropsch liquids (HFTL) 134 or commonly know as FT wax.

In order to trim or improve the efficiency of the overall process, the XTL unit 122 and specifically in advance of the syngas treatment unit 90 and/or the Fischer-Tropsch reactor 128 may be augmented with an external supply of hydrogen, indicated by 136 and 138, respectively. Further, at least some of the vapour from the Fischer-Tropsch reactor may be reintroduced in advance of the syngas treatment unit 90 as indicated by 140, and/or be used a fuel 114 in the upgrader. The liquids 130, 132 and 134 are introduced into hydroprocessing unit 108. This may also be augmented by straight run distillate naphtha 144 may be introduced from atmospheric distillation operation 82, light vacuum gas oil (LVGO) 142 from the vacuum distillation operation 110 and optionally, deasphalted oil 112 (DAO) from the SDA unit 84. A range of hydroprocessing treatments 108, as an example, hydrocracking, thermal cracking, isomerization, hydrotreating and fractionation, may be applied to the combined streams, individually or in desired combinations, well known to those skilled in the art, to create at least the synthetic crude oil product 116. As further options, any portion of the Fischer-Tropsch naphtha 130 particularly the paraffinic naphtha indicated by 150 may be reintroduced into the deasphalting unit 84 at 152 or further distributed as the solvent make up 156 for introduction into the oilsands froth treatment unit (not shown but generally noted by 158).

Further, additional hydrogen may be introduced into the hydroprocessing unit 108 and hydrotreating unit 160 at 166 and 164. The hydrogen supply may be taken from the hydrogen supply noted herein previously. From each of the fractionator, hydrotreater 160, hydroprocessing unit 108 and Fischer-Tropsch unit 128, product from each of these operations denoted by 170 or 172, 174 respectively is introduced to fuel gas 114. Further, a portion of 172 and 170 rich in hydrogen may be combined with the hydrogen lean syngas at 88 or 91 to enrich this stream for optimum performance of the Fischer-Tropsch unit.

Figure 6:
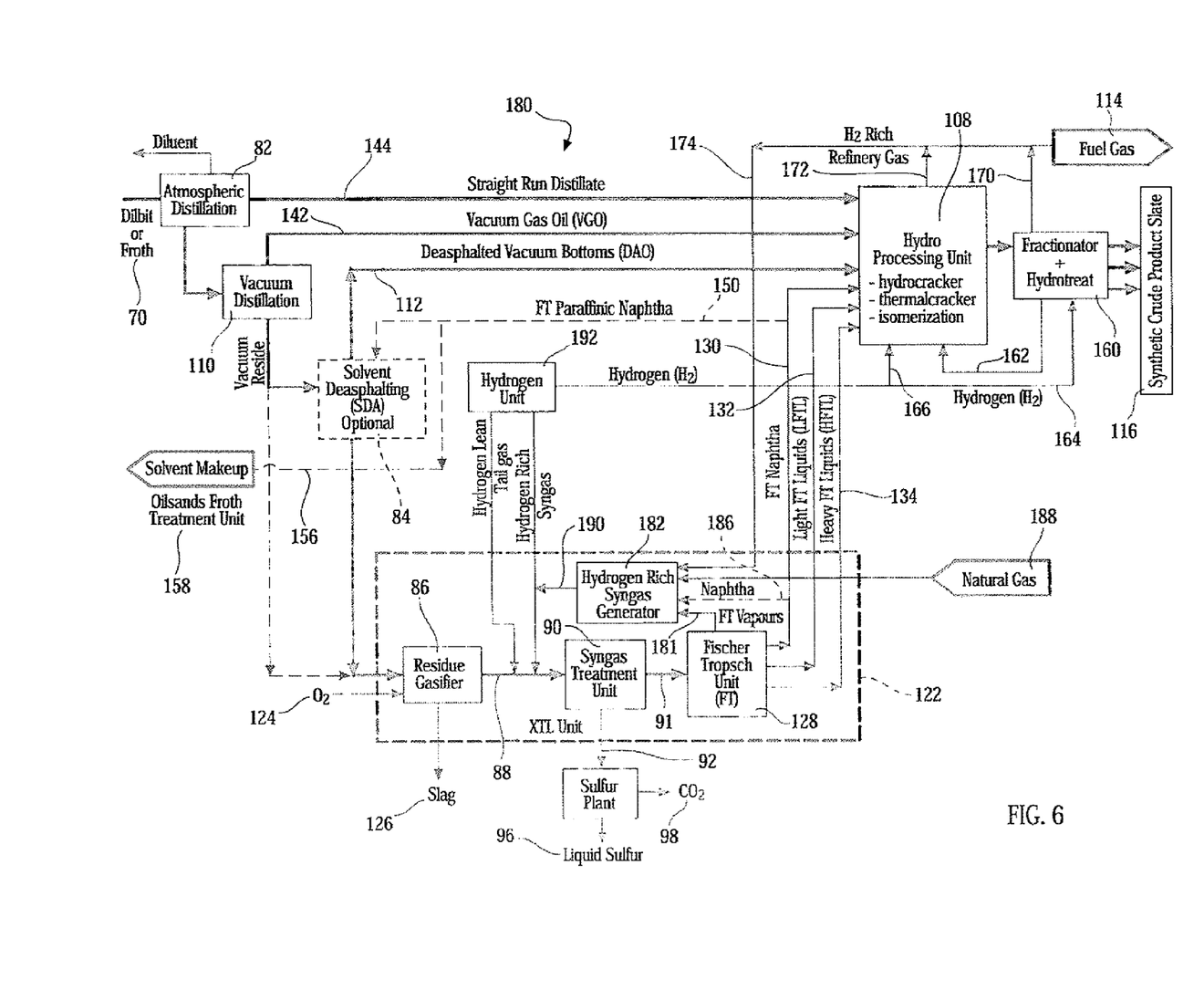
FIG. 6 is a process flow diagram illustrating a further embodiment of the present invention.

Turning to FIG. 6, shown in the process flow diagram is yet another variation on the methodology of the instant invention. The overall process in this embodiment is denoted by 180. Similar unit operations from those established in FIGS. 4 and 5 are applicable in FIG. 6.

The primary changes with respect to FIG. 5 versus FIG. 6, includes modification of the XTL, unit 122 and incorporation of hydrogen rich syngas generation and recycle of hydrogen rich syngas generated in the Fischer-Tropsch unit 128.

In greater detail, the XTL, unit 122 is modified to incorporate a hydrogen rich syngas generator, denoted by 182. The hydrogen rich syngas generator 182 is typically composed of a steam methane reformer (SMR) (not shown) or an auto thermal reformer (ATR) (not shown) and combinations thereof. Natural gas 188, Fischer-Tropsch vapours 184, hydrogen rich fuel gas 174, etc. from the hydroprocessor 108 and fractionation unit 160 and Fischer-Tropsch naphtha 186 may be supplied individually or in combination to unit 122 to generate hydrogen rich syngas 190 where the ratio between the hydrogen and the carbon monoxide is in range of 2:5 to 6:1. This is an important aspect of the invention and works in concert with the Fischer-Tropsch 128 to provide the effective results realized by practicing the technology as discussed herein with respect to FIGS. 5 through 6. Natural gas 188, depending on the current market situation at any location or time, may be used as a primary feedstock to the hydrogen rich syngas generator 182 and the steams 174, 130 and 184 may be used to maximize upgrader operation. Alternately, if the natural gas market is less favourable, streams 174, 130 and 184 may be fully utilized to offset the need for natural gas. The hydrogen rich syngas 190 can be introduced in advance of the syngas treatment unit 90 at 190 if treatment is required, or alternately, any portion of the hydrogen rich syngas 190 may be routed directly to the Ficher-Tropsch unit 128.

In this manner, the hydrogen rich syngas 190 is combined with the carbon rich syngas to create an optimum Fischer-Tropsch syngas where the ratio of the hydrogen to carbon monoxide is preferred 2:1. The combined feed streams to unit 122 reduces the amount of natural gas needed to achieve the optimum Fischer-Tropsch feed stream, thereby offering a commercial advantage of the upgraders dependence on natural gas, but also takes advantage of current low cost supply of natural gas.

Additionally, a portion of the hydrogen rich syngas 190 can be introduced to hydrogen unit 192 where a purified hydrogen stream 164 is generated for use in the hydroprocessing units 108 and 170. The hydrogen unit 192 may consist of a pressure swing adsorption (PSA), membrane or absorption technology, well known to those skilled in the art.

Figure 7:
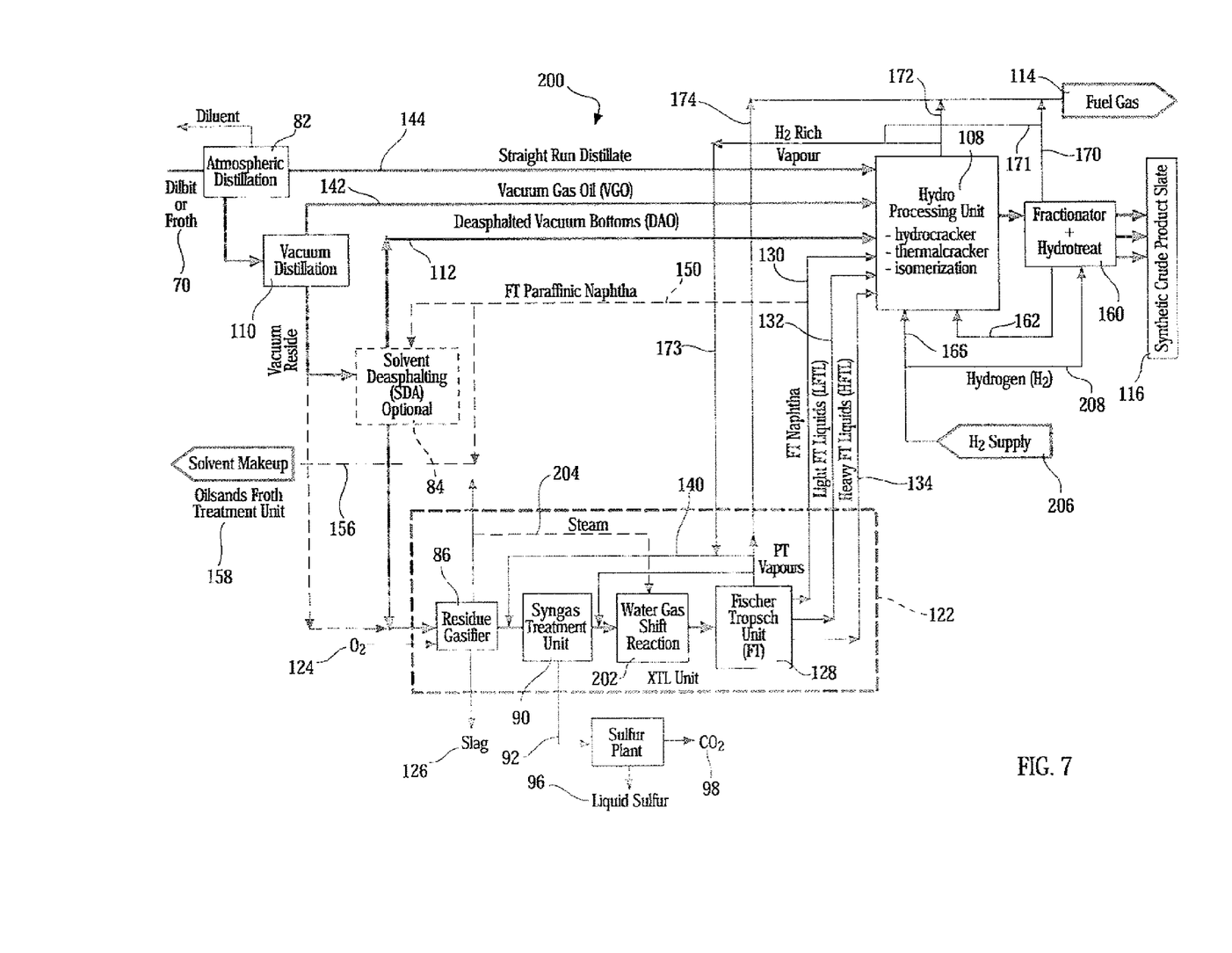
FIG. 7 is a process flow diagram illustrating yet another embodiment of the present invention.

Turning to FIG. 7, the process flow diagram illustrates a further variation on the overall concept of the present invention and in this manner, the XTL unit 122 undergoes further variation where the hydrogen unit 192 and hydrogen rich syngas generator 182 inherent in the embodiment FIG. 6 are replaced with a water gas shift (WGS) reaction unit operation. The overall process of FIG. 7 is denoted by 200. The water gas shift unit is denoted by 202 and is disposed between the syngas treatment unit 90 and the Fischer-Tropsch unit 128. As is known in the art and particularly by those skilled, the water gas shift reactor is useful to enrich the raw syngas which, in turn, results in optimization of the hydrogen to carbon monoxide ratio for the Fischer-Tropsch syngas. Steam supply for the WGS reaction unit 202 may be provided from the gasifier 86 shown as 204. Additionally, hydrogen rich gas 171 and 173 from the hydroprocessor units may be combined with the FT vapours 140 to enrich the FT syngas feed.

While the preferred embodiments of the invention have been shown and described, modifications thereof can be made by one skilled in the art without departing from the spirit and teachings of the invention. Reactor design criteria, hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Background of the Invention is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

I claim:

1. A process for upgrading heavy oil or bitumen to formulate synthetic hydrocarbons, comprising:
   (a) providing a source of heavy oil or bitumen feedstock;
   (b) treating said feedstock to form one or more distilled fractions and a non-distilled bottom fraction;
   (c) feeding said bottom fraction to a syngas generating circuit to generate a hydrogen lean syngas stream via a non-catalytic partial oxidation reaction, wherein said hydrogen lean syngas stream has a hydrogen to carbon monoxide ratio of less than one part hydrogen to one part carbon monoxide;
   (d) adding an external source of hydrogen to said hydrogen lean syngas to generate a hydrogen rich syngas stream optimum for Fischer-Tropsch reaction; and
   (e) reacting said hydrogen rich syngas stream in a Fischer-Tropsch reactor to formulate said synthetic hydrocarbons, at least one of which is synthetic crude oil.

2. The process as set forth in claim 1, wherein said external source of hydrogen comprises a hydrogen rich syngas stream produced from a hydrogen rich syngas generator.

3. The process as set forth in claim 2, wherein said hydrogen rich syngas generator is selected from the group consisting of a steam methane reformer (SMR), autothermal reformer (ATR) and combinations thereof.

4. The process as set forth in claim 2, wherein said hydrogen rich syngas generator uses hydrogen rich feed to generate said hydrogen rich syngas stream.

5. The process as set forth in claim 4, wherein said hydrogen rich feed is selected from the group consisting of natural gas, FT vapours, FT naphtha, hydroprocessor vapours and combinations thereof.

6. The process as set forth in claim 2, further including purifying at least a portion of said hydrogen rich syngas.

7. The process as set forth in claim 6, wherein purification of said hydrogen rich syngas is performed by pressure swing adsorption, membrane or liquid absorption.

8. The process as set forth in claim 1, wherein said bitumen is provided as a froth or diluted bitumen (dilbit), and step b) includes feeding said feedstock to an atmospheric distillation unit.

9. The process as set forth in claim 1, wherein said bottom fraction is fed to a gasifier within said syngas generating circuit.

10. The process as set forth in claim 9, wherein said bottom fraction is converted to a sour hydrogen lean syngas stream.

11. The process as set forth in claim 10, further including the step of treating said hydrogen lean syngas stream to a sour syngas treatment operation.

12. The process as set forth in claim 11, further including the step of treating said hydrogen lean syngas stream to a series of unit operations prior to reaction in said Fischer-Tropsch reactor.

13. The process as set forth in claim 1, wherein said synthetic hydrocarbons include at least one of Fischer-Tropsch vapours, paraffinic naphtha, light Fischer-Tropsch liquid and heavy Fischer-Tropsch liquid.

14. The process as set forth in claim 1, further including the step of processing said synthetic hydrocarbons in a hydroprocessing unit.

15. The process as set forth in claim 1, wherein said one or more distilled fractions comprise straight run distillate, vacuum gas oil (VGO) fraction and deasphalted oil (DAO), and said process further including the step of processing said straight run distillate, vacuum gas oil (VGO) fraction and deasphalted oil (DAO) in a hydroprocessing unit.

16. The process as set forth in claim 15, wherein said hydroprocessing unit includes at least one operation selected from the group consisting of hydrocracking, thermocracking, hydrotreating, isomerization, fractionation and combinations thereof.

17. The process as set forth in claim 1, further including the step of augmenting the process with an auxiliary source of hydrogen.

18. The process as set forth in claim 17, wherein said auxiliary source of hydrogen comprises hydroprocessing unit gas.

19. The process as set forth in claim 18, wherein said auxiliary source of hydrogen comprises hydrogen rich gas from hydrocracker, thermal cracker, hydrotreater, isomerization unit, fractionator and combinations thereof.

20. The process as set forth in claim 17, wherein said auxiliary source of hydrogen comprises natural gas.

21. The process as set forth in claim 2, wherein said hydrogen rich syngas generator includes at least one of an autothermal reformer, a steam methane reformer and a combination thereof for receiving as feedstock at least one of natural gas, Fischer-Tropsch vapours, Fischer Tropsch naphtha, refinery fuel gas and combinations thereof, to generate hydrogen rich syngas.

22. The process as set forth in claim 1, wherein said bitumen is an in situ source.

23. The process as set forth in claim 1, wherein said bitumen is a mineable source.

24. A process for upgrading bitumen to formulate hydrocarbon products, comprising:
   (a) providing a source of processed bitumen or heavy oil feedstock in the form of a non-distilled bottoms fraction;
   (b) forming said hydrocarbon products via Fischer-Tropsch reaction of hydrogen lean syngas generated from non-catalytic partial oxidation reaction of said non-distilled bottoms fraction, wherein said hydrogen lean syngas stream has a hydrogen to carbon monoxide ratio of less than one part hydrogen to one part carbon monoxide; and
   (c) adding an external source of hydrogen to said hydrogen lean syngas to create an optimum syngas composition for the synthesis of said hydrocarbon products at least one of which is synthetic crude oil.

25. The process as set forth in claim 24, wherein said external source of hydrogen comprises a hydrogen rich syngas stream produced from a hydrogen rich syngas generator.

26. The process as set forth in claim 25, wherein said hydrogen rich syngas generator is selected from the group consisting of a steam methane reformer (SMR), autothermal reformer (ATR) and combinations thereof.

27. The process as set forth in claim 26, wherein said hydrogen rich syngas generator uses hydrogen rich feed to generate said hydrogen rich syngas stream.

28. The process as set forth in claim 27, wherein said hydrogen rich feed is selected from the group consisting of natural gas, FT vapours, FT naphtha, hydroprocessor vapours and combinations thereof.

29. The process as set forth in claim 27, further including purifying at least a portion of said hydrogen rich syngas.

30. The process as set forth in claim 29, wherein purification of said hydrogen rich syngas is performed by pressure swing adsorption, membrane or liquid absorption.

31. The process as set forth in claim 24, wherein treating said bitumen includes providing said bitumen as a froth or diluted bitumen (dilbit) as a feed to an atmospheric distillation unit.

32. The process as set forth in claim 2, further comprising subjecting at least a portion of said hydrogen rich syngas stream to a water gas shift (WGS) reaction.

33. The process as set forth in claim 25, further comprising subjecting at least a portion of said hydrogen rich syngas stream to a water gas shift (WGS) reaction.

34. The process as set forth in claim 1, wherein said hydrogen rich syngas stream optimum for Fischer-Tropsch reaction is a hydrogen to carbon monoxide ratio of from 1.8:1 to 2.2:1.

35. The process as set forth in claim 24, wherein said hydrogen rich syngas stream optimum for Fischer-Tropsch reaction is a hydrogen to carbon monoxide ratio of from 1.8:1 to 2.2:1.

\* \* \* \* \*